United States Patent
Irisawa et al.

(10) Patent No.: US 7,367,047 B2
(45) Date of Patent: Apr. 29, 2008

(54) PORTABLE INFORMATION RECORDING MEDIUM

(75) Inventors: Kazuyoshi Irisawa, Tokyo (JP); Naoto Shibata, Tokyo (JP); Tetsuo Shinriki, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 505 days.

(21) Appl. No.: 10/486,676

(22) PCT Filed: Nov. 22, 2002

(86) PCT No.: PCT/JP02/12219

§ 371 (c)(1),
(2), (4) Date: Feb. 12, 2004

(87) PCT Pub. No.: WO03/046826

PCT Pub. Date: Jun. 5, 2003

(65) Prior Publication Data

US 2004/0199784 A1    Oct. 7, 2004

(30) Foreign Application Priority Data

Nov. 27, 2001 (JP) ............................. 2001-360284

(51) Int. Cl.
*H04L 9/00* (2006.01)
(52) U.S. Cl. .............................. 726/2; 726/26; 726/27; 726/30; 711/100; 711/103; 235/487
(58) Field of Classification Search ............... 726/2, 726/26–27, 30; 711/100, 103; 235/487
See application file for complete search history.

(56) References Cited

U.S. PATENT DOCUMENTS

| | | | | |
|---|---|---|---|---|
| 5,684,998 A | * | 11/1997 | Enoki et al. | 713/310 |
| 5,754,762 A | * | 5/1998 | Kuo et al. | 726/23 |
| 6,003,113 A | * | 12/1999 | Hoshino | 711/106 |
| 6,425,522 B1 | * | 7/2002 | Matsumoto et al. | 235/380 |
| 6,527,190 B1 | * | 3/2003 | Weinlander | 235/487 |
| 6,575,835 B1 | * | 6/2003 | Mishina et al. | 463/42 |
| 6,611,819 B1 | * | 8/2003 | Oneda | 705/41 |
| 6,832,302 B1 | * | 12/2004 | Fetzer et al. | 711/170 |
| 2002/0188852 A1 | * | 12/2002 | Masaki et al. | 713/182 |

FOREIGN PATENT DOCUMENTS

| | | |
|---|---|---|
| JP | 10-116329 A | 5/1998 |
| JP | 2001-147997 | 5/2001 |
| JP | 2001-256460 A | 9/2001 |

* cited by examiner

*Primary Examiner*—Kim Vu
*Assistant Examiner*—Yin-Chen Shaw
(74) *Attorney, Agent, or Firm*—Ladas and Parry LLP

(57) ABSTRACT

When in order to enable the use of a plurality of applications (AP1 to AP3) simultaneously, preparation commands, having identifiers attached, are provided according to the respective applications and working areas for the respective applications are secured inside a RAM (134). By providing a verification command having a specific identifier, a verification process concerning a specific application is performed and a verification result is stored in the corresponding application working area. This verification result is used until the completion of a communication session. To make a specific application execute a desired process, a process executing command that designates an identifier attached to the corresponding application is provided. Adequate security can be ensured and yet a series of linked processes can be performed smoothly while switching among a plurality of application programs in the same communication session.

16 Claims, 3 Drawing Sheets

Fig.4

APPLICATION AP1 WORKING AREA

VERIFICATION RESULT (COMMANDS ENABLED FOR EXECUTION)

READ RECORD
UPDATE RECORD
WRITE RECORD

APPLICATION AP2 WORKING AREA

VERIFICATION RESULT (COMMANDS ENABLED FOR EXECUTION)

READ RECORD
UPDATE RECORD

Fig.5

MANAGE CHANNEL    (INQUIRY COMMAND)

Ch1, Ch2    (RESPONSE)
↑
└── DEFINED IDENTIFIERS

OR

Ch3, Ch4, Ch5, Ch6, Ch7, Ch8    (RESPONSE)
↑
└── UNDEFINED IDENTIFIERS

PORTABLE INFORMATION RECORDING MEDIUM

TECHNICAL FIELD

This invention relates to a portable information recording medium and, in particular, relates to a portable information recording medium having a function of being connected as necessary to an external device and recording user data to be recorded in its interior and performing various processes in accordance with command-and-response interactions with the external device.

BACKGROUND ART

The recording capacities of portable information recording media have improved greatly with the progress of semiconductor circuit integration, and future demands are anticipated in various fields, especially with IC cards and other portable information recording media having a built-in CPU. For example, an IC card with a built-in CPU has a function of being connected as necessary to an external device (reader/writer device) and executing specific processes in accordance with command-and-response interactions with this external device. Since the process that is executed inside the IC card when a certain command is provided is determined by an OS program or an application program installed in the IC card, dedicated application programs with processing functions for various applications are normally installed inside the IC card. For example, in a case where the same IC card is to be used as a hospital registration card and as a financial account card, both an application program for a hospital registration card and an application program for a financial account must be installed in the IC card. Thus, due to the recent significant improvements in the memory capacities incorporated in IC cards, multi-application IC cards, having a plurality of application programs installed in advance, are becoming popular. IC cards, equipped with a function of adding new application programs as necessary after issue, are also being used widely. For example, Japanese Laid-open Patent Publication No. 10-79000 discloses an IC card with a function of adding programs for upgrading, etc.

A major characteristic of a portable information medium with a built-in CPU is that an advanced form of security can be ensured. For example, in the case of a general IC card that is popularly used presently, a verification process is executed in the process of starting communication with an external device upon connection of the IC card with the external device. Normally, a verification step is performed in which a verification command with verification data is received from the external device, a judgment of the propriety of the provided verification data inside the IC card is conducted, and a verification result is stored in the internal memory of the IC card. According to the verification data provided from the external device, various verification results may be obtained, such as enabling of just reading of data inside the IC card, enabling of just adding of new data, or enabling of even rewriting of existing data. Thus normally, an arrangement is adopted wherein the above-described verification process is executed at a starting point of a communication session, the verification result is stored in the memory inside the IC card, and when various commands are provided from the external device, the verification result stored in the memory is referenced to judge whether or not the execution of a provided command is enabled, and a command is executed only when it has been judged that its execution is enabled. Since a RAM or other volatile memory is used as the memory for storing the verification result, when a single communication session is completed and the external device is disconnected, the verification result is erased from within the IC card. As the verification process is required at each communication session, adequate security can be secured even in a case of loss of the IC card, etc.

As mentioned above, with built-in CPU type portable information recording media, as represented by IC cards, the installation of a plurality of application programs in accordance with applications is becoming popular. It is thus predicted that the number of application programs that are installed in a single portable information recording medium will increase further in the future. Obviously, an application command provided from an external device is processed by one program among the plurality of application programs that are installed. Thus in providing an application command, prior preparation is necessary for specifying the application program that is to perform a process. Normally, this preparation is made by providing an application selection command, which includes information that selects a specific application.

For example, let assume the case where an IC card, in which both a hospital registration application program and a financial account application program are installed, is to be used at a hospital counter. In this case, it is necessary to carry out a preparation step after connection of the IC card to an external device installed at the hospital counter. In this preparation step, a selection command for selecting the hospital registration card application program is provided from the external device to the IC card so that such a selection state is set up and a verification process unique to the application is performed so that the verification result is stored in a memory (RAM). After the selected state, in which the hospital registration card application is selected, has been set, the normal commands provided from the external device are all processed by the hospital registration card application that is in the selected state. As mentioned above, the enabling or disabling of the execution of each command is determined based on the verification result that is stored in the memory.

In order to secure an advanced degree of security in such a multi-purpose IC card, etc., as described above, arrangements must be made to perform a verification process according to each individual application. Thus with prior-art multi-purpose IC cards, etc., each time a new application is selected, a verification program concerning the selected application program must be performed. For example, let assume the case where a diagnosis and treatment record is to be written into an IC card as a hospital registration card and a diagnosis and treatment fee is to be paid using the IC card as a financial account card. In this case, after connecting the IC card to an external device installed at a hospital counter, first, a selection command for selection of the hospital registration card application program is provided from the external device to the IC card to set up the state in which the hospital registration card application is selected, and in continuation after the execution of a diagnosis and treatment record writing process, a selection command for selection of the financial account application program is provided from the external device to the IC card to set up the state in which the financial account application is selected and a process of writing the diagnosis and treatment fee payment information is executed. It is predicted that such a form of use in which a plurality of applications are used in the same communication session to perform a series of linked process will become more popular in the future.

However, with a prior-art portable information recording medium, a selection command must be provided each time an application is switched and a verification process concerning the application must also be performed each time. Thus, when a series of linked processes are to be performed by switching among a plurality of applications in the same communication session, the internal processing load of the portable information recording medium and the load of communication with an external device become excessive.

An object of this invention is thus to provide a portable information recording medium that enables adequate security to be ensured for each individual application and yet enable a series of linked processes to be performed while switching among a plurality of application programs in the same communication session.

DISCLOSURE OF INVENTION (1) The first feature of the present invention resides in a portable information recording medium having a function of being connected as necessary to an external device and performing command-and-response interactions with the external device to record user data to be recorded inside the medium and perform various processes, the portable information recording medium comprising:

an I/O part, communicating with the external device;

an OS storage part, storing an OS program;

an application storage part, storing a plurality of application programs;

a user data storage part, storing user data;

a process executing part, executing a command provided from the external device and returning an execution result as a response to the external device based on the OS program or the application programs; and a working data storage part, used as a working area for the process executing part and securing at least an OS working area for storing working data for the OS program;

wherein when a preparation command including information designating an application program and a unique identifier to be attached to the designated application program is provided from the external device, the process executing part executes a process of securing an application working area for storing working data for the designated application program in the working data storage part, and a process of storing information defining a correspondence between the designated application program and the identifier to be attached thereto and information specifying the secured application working area in the OS working area, thereby setting up a state in which use of the designated application program is enabled; and wherein when a process executing command for making a specific application program designated by an identifier execute a specific process is provided from the external device, the process executing part executes the specific process in accordance with the specific application program and using an application working area secured for the specific application program.

(2) The second feature of the present invention resides in a portable information recording medium according to the first feature:

wherein when a verification command for performing verification concerning an application program designated by an identifier is provided from the external device, the process executing part executes a verification process in accordance with the verification command and a process of storing a verification result in an application working area secured for the application program; and wherein when a process executing command for making the application program designated by the identifier execute a specific process is provided from the external device, the process executing part executes a process of referencing the verification result stored in the application working area secured for the application program, judging whether or not an execution of the process executing command is enabled, and if a judgment that the execution is enabled is made, executing the specific process in accordance with the application program.

(3) The third feature of the present invention resides in a portable information recording medium according to the second feature:

wherein when a verification command concerning a specific application program is provided from the external device, the process executing part stores information as a verification result in the application working area, the information indicating a list of commands enabled for execution by the specific application program.

(4) The fourth feature of the present invention resides in a portable information recording medium according to the first to the third features:

wherein, as information which specifies an application working area secured in the working data storage part, a head address of the area and a size of the area are stored in the OS working area.

(5) The fifth feature of the present invention resides in a portable information recording medium according to the first to the fourth features:

wherein when a preparation command is provided from the external device, the process executing part examines contents of an application program stored in the application storage part and secures an application working area of a size that is in accordance with an examination result.

(6) The sixth feature of the present invention resides in a portable information recording medium according to the fifth feature:

wherein a size of an application working area for an application program is determined based on information concerning variables and arrays used in the application program.

(7) The seventh feature of the present invention resides in a portable information recording medium according to the first to the sixth features:

wherein when an inquiry command, which makes an inquiry concerning a newly useable identifier, is provided from the external device, the process executing part performs a process of examining the OS working area to recognize identifiers in defined and undefined states and returns recognized identifiers as a response to the external device.

(8) The eighth feature of the present invention resides in a portable information recording medium according to the first to the seventh features:

wherein the OS storage part, the application storage part, and the user data storage part are arranged from non-volatile memories and the working data storage part is arranged from a volatile memory.

BRIEF DESCRIPTION OF THE DRAWINGS

FIG. 4 is a diagram showing an example of lists of commands enabled for execution that are written into the application working area as verification results.

FIG. 5 is a diagram showing an example of an inquiry command for making an inquiry concerning identifiers that are available at the present point in time and examples of responses made in accordance with this command.

BEST MODE FOR CARRYING OUT THE INVENTION

This invention shall now be described based on an illustrated embodiment. Though this invention is widely applicable to general portable information recording media, an example where this invention is applied to an IC card, which is the most popularly used portable information recording medium, shall be described.

<<<§ 1. Basic Arrangement of IC Card of the Invention >>>

Figure 1:
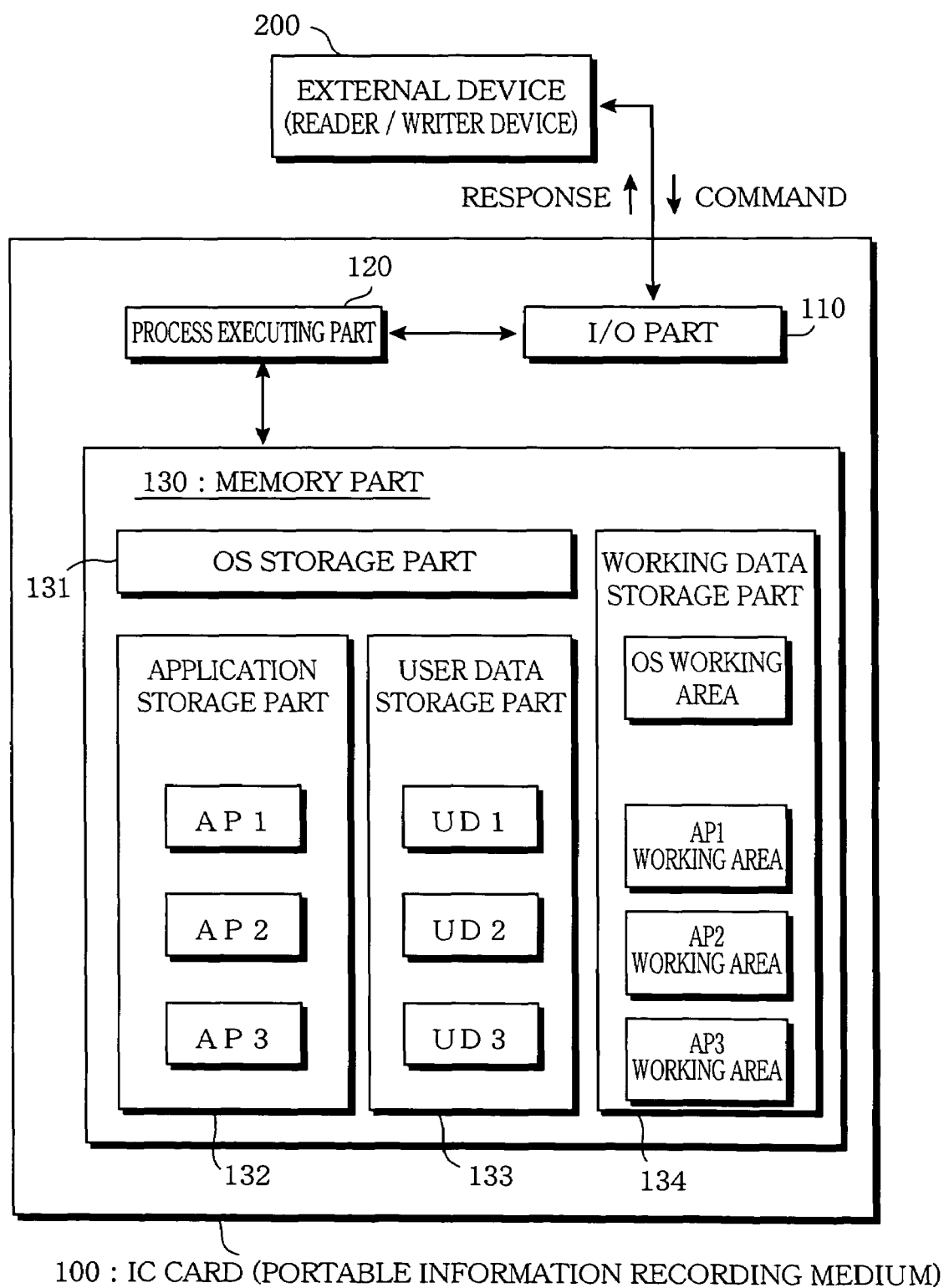
FIG. 1 is a block diagram showing the condition where an IC card 100 of an embodiment of this invention is connected to an external device 200.

FIG. 1 is a block diagram showing the condition where an IC card 100 (portable information recording medium) of an embodiment of this invention is connected to an external device 200. External device 200 is a device that is generally called a reader/writer device and is normally used upon connection to a personal computer, etc. IC card 100 comprises an I/O part 110 for communicating with external device 200, a process executing part 120 executing various processes within the IC card, and a memory part 130 storing various data and programs. The communication between IC card 100 and external device 200 is carried out by command-and-response interactions. That is, when a certain command is sent from external device 200 to IC card 100, this command is received by I/O part 110 and transmitted to process executing part 120. Process executing part 120 interprets and executes this command and returns the processing result as a response to I/O part 110. This response is sent from I/O part 110 to external device 200. Process executing part 120 performs execution of the provided command based on a program stored inside memory part 130, and in accompaniment with the execution of this command, accesses data that are stored in memory part 130 as necessary. As shown in the Figure, memory part 130 is arranged from the four storage parts of an OS storage part 131, an application storage part 132, a user data storage part 133, and a working data storage part 134.

The above-described respective components are components defined in regard to functional aspects for the purpose of description of this invention and do not correspond to actual hardware components. In actuality, process executing part 120 is realized by a CPU or other logical device embedded inside the IC card. Needless to say, process executing part 120 is not a component that can be realized by a CPU or other hardware alone but is a component that is realized under the premise of operations based on programs stored inside memory part 130. Memory part 130 is realized by a memory, such as a ROM, RAM, EEPROM, etc. In the case of the embodiment illustrated here, OS storage part 131 is realized by a ROM, application storage part 132 and user data storage part 133 are realized by EEPROM's, and working data storage part 134 is realized by a RAM. Though the memory configuration for putting this invention into practice does not necessarily have to be that of the present embodiment, in the case of a general type portable information recording medium without a built-in power supply (in other words, in the case of a portable information recording medium of a type that receives the supply of electricity from the external device 200 upon connection to external device 200), OS storage part 131, application storage part 132, and user data storage part 133 must be arranged as non-volatile memories so that the data can be held even after disconnection from external device 200. Also, at least user data storage part 133 must be arranged as a rewritable non-volatile memory (EEPROM). For practical use, application storage part 132 is also arranged as a rewritable non-volatile memory so that new application programs can be installed as necessary. Meanwhile, working data storage part 134 is arranged as a rewritable volatile memory (RAM) from the standpoint of ensuring security. With this arrangement, when IC card 100 is disconnected from external device 200 and carried, only the data inside working data storage part 134 are erased.

The information stored in the respective storage parts that make up memory part 130 shall now be described. An OS program that describes the basic operations of IC card 100 is stored in OS storage part 131. Presently, JavaCard, MULTOS, are popular as OS programs for IC cards, and process executing part 120 performs basic operations based on such an OS program. Meanwhile, a plurality of application programs are stored in application storage part 132. In the case of the illustrated embodiment, application storage part 132 is provided in a memory area inside an EEPROM and the specifications enable arbitrary addition of application programs after issuing of the IC card. The example of FIG. 1 illustrates a case where three application programs AP1, AP2, and AP3 are already installed. User data to be recorded in IC card 100, such as personal data, transaction data, etc., concerning a user who is the owner of this IC card 100 (and including data concerning the issuer of the IC card), are stored in user data storage part 133. With the illustrated example, user data UD1, UD2, and UD3, used in application programs AP1, AP2, and AP3, respectively, are stored separately and independently. Obviously, and though not shown in the illustrated example, common user data that are used in common by a plurality of applications may also be stored in addition to the above.

Working data storage part 134 is an area that is used as a working area for process executing part 120. If a command provided from external device 200 is an OS command, process executing part 120 executes this command based on an OS program inside OS storage part 131, if a command provided from external device 200 is an application command, this command is executed based on specific application program inside application storage part 132, and the respective execution results are returned as responses to external device 200. In all cases, working data storage part 134 is used as the working area. As shall be described later, when process executing part 120 executes an OS program, an OS working area inside working data storage 134 is used as the working area, and when process executing part 120 executes a predetermined application program, an application working area secured for the application inside working data storage part 134 is used as the working area. Here, whereas the OS working area is secured automatically inside working data storage part 134 by an initial setting operation performed at the point at which IC card 100 is connected to external device 200 and a communication session is started, as shall be described below, each individual application working area is secured by a preparation command being provided from external device 200.

<<<§ 2. Basic Operations of the IC Card of the Invention >>>

The basic operations of the IC card shown in FIG. 1 shall now be described. IC card 100 is a typical portable information recording medium and is normally carried by a user. With the present embodiment, since the power for IC card 100 is supplied from external device 200 as mentioned above, power is not supplied to IC card 100 while it is carried. However, since OS storage part 131, application storage part 132, and user data storage part 133 are arranged from non-volatile memories, the data recorded in these respective storage parts will not become lost. On the other hand, since working data storage part 134 is arranged from a volatile memory (RAM), the data in working data storage part 134 become lost when the card is carried.

As mentioned in the previously described example, when recording of a diagnosis and treatment data is to be carried out and payment in regard to a financial account is to be performed, this IC card 100 is connected to external device 200 to perform communication between the two. At the start of communication, power is supplied from external device 200 to IC card 100, the CPU in the IC card 100 is reset, process executing part 120 executes an initial routine of the OS program stored in OS storage part 131 and performs the task of preparing an environment for the communication session. The OS working area inside working data storage part 134 is secured at this point. After the environment for performing a communication session has thus been prepared, interactive communication, wherein when a command is provided from external device 200, a corresponding response is returned from IC card 100, is repeated. When a single communication session is completed, IC card 100 is disconnected from external device 200 and is carried by the user again. At this point, all of the contents of working data storage part 134, which is arranged from a volatile memory (RAM), become lost. Though a verification result is recorded inside working data storage part 134 as mentioned above, this verification result is cleared for each communication session, and this is suitable for ensuring security.

When an OS command is provided from external device 200, process executing part 120 performs a process of executing this command based on the OS program inside OS storage part 131 and returning a corresponding response to external device 200. If the provided command is an application command, process executing part 120 performs a process of executing this command based on one of the application programs inside application storage part 132 and returning a corresponding response to external device 200. However when an application command is to be executed, preparation concerning the application must be carried out in advance.

In the case of a general, prior-art IC card, the preparation concerning a specific application was carried out by means of a selection command that selects the specific application from external device 200. With the prior-art preparation method based on such a selection command, only one of the application programs could be put in the prepared state, and a new selection command had to be provided when switching to another application program. Moreover as mentioned above, since when a new selection command for switching to an application is provided, a verification process concerning the application must be performed each time, when a series of linked processes are to be performed by switching among a plurality of applications in the same communication session, the internal processing load of IC card 100 and the load of communication with external device 200 become excessive.

The basic concept on which the present invention is based is that by putting a plurality of application programs in a prepared state simultaneously, defining identifiers respectively for each of the individual applications in the prepared state, and adding the identifiers respectively to each of the individual commands provided from external device 200, one application is specified from among the plurality of applications that are put in the prepared state simultaneously and the provided command is processed in accordance with the specified application program. With this invention, in order to maintain a plurality of applications simultaneously in the prepared state, separate working areas are secured inside working data storage part 134 for the respective individual applications and the verification results of the respective applications are stored respectively in these working areas.

Specific operations based on such a basic concept shall now be described with an example that uses the series of commands (1) to (10) shown in FIG. 2. Of the illustrated commands, (1) and (2) are preparation commands (OS commands) for putting individual application programs into the prepared state, (3) to (8) are verification commands (application commands) for performing verification concerning each individual application program, and (9) and (10) are process executing commands (application commands) for executing specific processes using the individual application programs. Here, for convenience of description, let assume the example where, as shown in FIG. 1, three application programs AP1, AP2, and AP3 are stored inside application storage part 132, with AP1 being a hospital registration card application, AP2 being a financial account application, and AP3 being a gas station service application. This IC card 100 is thus used for the three applications of hospital registration card, financial account card, and gas station service card.

Here, consider a case where the user of this IC card 100 is to write a diagnosis and treatment record into the IC card as a hospital registration card and is to pay diagnosis and treatment fees using the IC card as a financial account card at a hospital counter. In this case, with a prior-art IC card, after connecting the IC card to an external device installed at the hospital counter, first, a selection command for selection of the hospital registration card application program is provided from the external device to the IC card to set up the state in which the hospital registration card application is selected, and in continuation after the execution of a diagnosis and treatment record writing process, a selection command for selection of the financial account application program is provided from the external device to the IC card to set up the state in which the financial account application is selected and a process of writing the diagnosis and treatment fee payment information is executed. Here, each time a selection command is provided, a verification process determined according to the corresponding application must be performed. On the other hand with the present invention, as shown in FIG. 2, after first providing preparation commands (1) and (2) to put the two applications AP1 and AP2 necessary for the series of processes in the prepared states simultaneously, verification commands (3) to (5) for application AP1 and verification commands (6) to (8) for application AP2 are provided to perform the respective verification processes for these applications and the results are stored in working data storage part 134. In this state, applications AP1 and AP2 are already put simultaneously in the preparation completed and verification completed states. By then providing specific process executing commands (9)

and (10) to the individual applications, the respective application programs are made to execute the specific processes.

Figure 2:
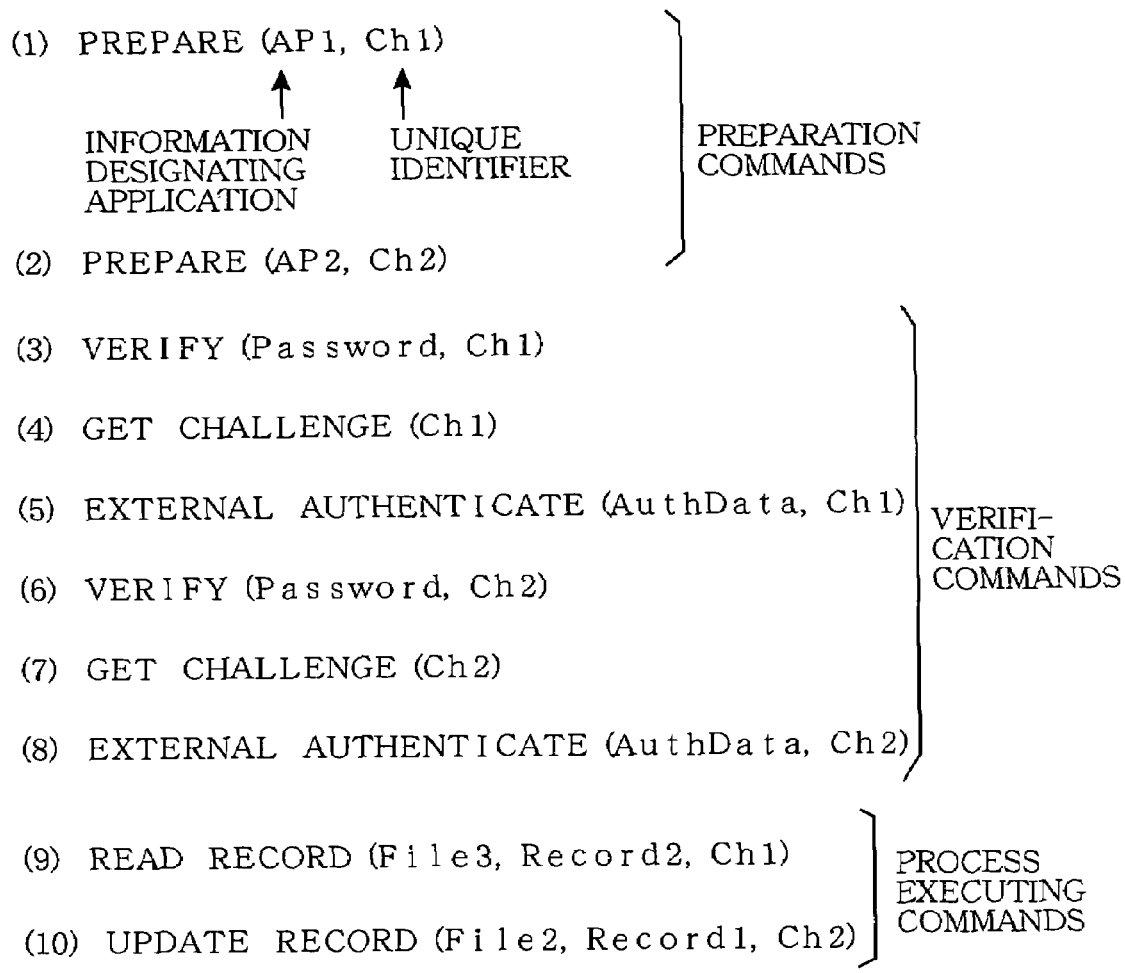
FIG. 2 is a diagram showing an example of a series of commands provided from the external device to the IC card according to the present invention.

Each of the preparation commands (1) and (2) shown in FIG. 2 contains information designating a specific application program and a unique identifier to be attached to the designated application program. For example, preparation command (1) comprises the command name, "PREPARE," which indicates the command as being a preparation command, the information (for example, the application name) that designates application AP1 (hospital registration card application), and the unique identifier, "Ch1," which is to be attached to this designated application program. When such a preparation command is provided, process executing part 120 performs a process of securing, inside working data storage part 134, an application working area for storing working data for the designated application and storing information defining the correspondence between the designated application program and the unique identifier to be attached thereto and information specifying the secured application working area in the OS working area to set up a state in which use of the specified application program is enabled.

Specifically, when preparation command (1) is provided, an AP1 working area is secured as the working area for application AP1 inside working data storage part 134 as shown in FIG. 1. Furthermore, information defining the correspondence of application AP1 and the unique identifier, "Ch1," to be attached thereto and information specifying the secured AP1 working area are written into the OS working area (which is already secured in the environment preparation stage of the communication session that is carried out immediately after connection of IC card 100 to external device 200 as mentioned above) inside working data storage part 134. Likewise, when preparation command (2) is provided, an AP2 working area is secured as the working area for application AP2 inside working data storage part 134. Furthermore, information defining the correspondence of application AP2 and the unique identifier, "Ch2," to be attached thereto and information specifying the secured AP2 working area are written into the OS working area inside working data storage part 134.

Figure 3:
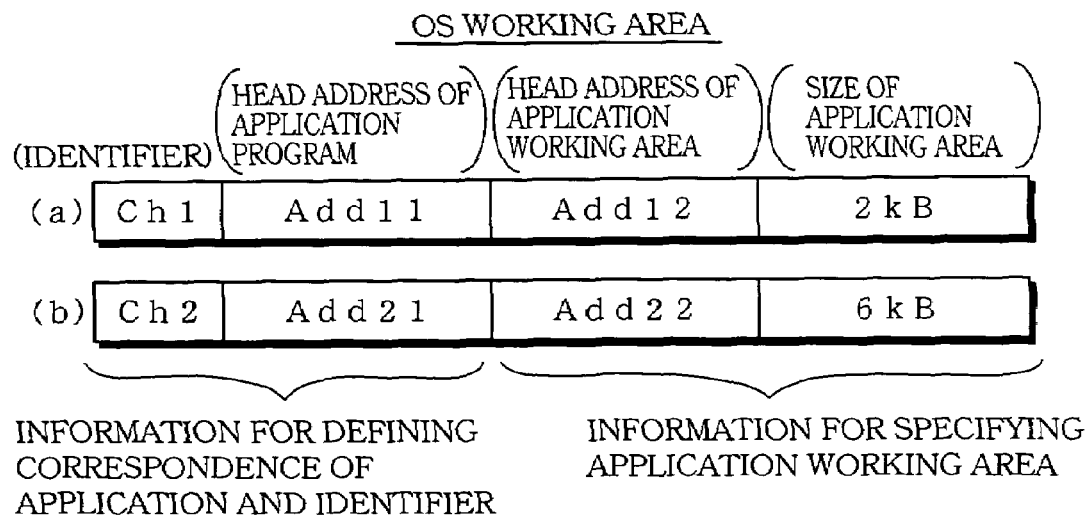
FIG. 3 shows diagrams of examples of information written into an OS working area by the execution of preparation commands (1) and (2) shown in FIG. 2.

FIG. 3 shows diagrams of examples of the information written into the OS working area by the execution of the above-described preparation commands (1) and (2). The information shown in FIG. 3(a) is the information written by preparation command (1) and the information shown in FIG. 3(b) is the information written by preparation command (2). With these examples, as the information defining the correspondence of an application program and a unique identifier to be attached thereto, an identifier and the head address of the corresponding application program are written in an associated manner. For instance, with the example of FIG. 3(a), by storing the identifier, "Ch1," and the address, "Add11," (the head address of application program AP1 stored inside application storage part 132) in an associated manner, it is indicated that application program AP1 corresponds to the identifier "Ch1." Also as the information specifying the application working area secured inside working data storage part 134, the head address of the area and the size of the area are stored. For instance, with the example of FIG. 3(a), the working area for AP1 is specified by the head address, "Add12," of the application AP1 working area (head address of the area secured inside working data storage part 134) and the size, "2 kB," of this area. The information shown in FIG. 3(b) is the same type of information concerning application AP2.

Consequently, by the execution of preparation commands (1) and (2), a state is set up in which two application working areas (the AP1 working area and the AP2 working area; the AP3 working area shown in FIG. 1 is not secured in the operation example shown in FIG. 2) are secured inside working data storage part 134 and the information shown in FIG. 3 are stored in the OS working area. By the execution of such preparation commands, the use of two applications AP1 and AP2 are enabled simultaneously. Thus unlike the selection commands used in prior-art IC cards, the preparation commands of the present invention can enable the use of a plurality of application programs simultaneously. In actually using the individual application programs, the following verification process must be carried out.

The verification commands (3) to (8) shown in FIG. 2 are verification commands that are generally used in prior-art IC cards as well and the actual verification process that is executed by the use of these commands is the same as the verification process carried out with prior-art IC cards. However, a characteristic of a verification command of this invention is that a specific identifier is contained within the command and a specific application program, which is subject to the verification process, is designated by this specific identifier. For example, all of the verification commands (3) to (5) contain the identifier, "Ch1," indicating that these verification commands are commands concerning application program AP1, and all of the verification commands (6) to (8) contain the identifier, "Ch2," indicating that these verification commands are commands concerning application program AP2. With this invention, since a plurality of application programs are put in the use-enabled state simultaneously, when providing a verification command for an application, an identifier for specifying one of the plurality of application programs in the use-enabled state becomes necessary.

Verification command (3) is a command for checking whether or not a password provided from external device 200 (the data, "Password," which is contained in the command) matches the password concerning application AP1 that is stored in IC card 100 (stored among user data UD1 in user data storage part 133), and the verification result that is obtained by the execution of the verification process in accordance with this verification command is written into the AP1 working area. Specifically, a password matched/ unmatched result (in a case where a plurality of passwords are stored in IC card 100, a result indicating with which of the passwords matching is realized) is stored as the verification result.

Meanwhile, verification commands (4) and (5) area command pair for executing a single verification process by means of two commands. First, verification command (4) is a command that causes the generation of an arbitrary random number inside IC card 100 and requests the returning of this random number as a response to external device 200. Process executing part 120 performs a process of generating a random number for application AP1 in accordance with the identifier, "Ch1," that is contained in this command and returning this random number as a response to external device 200. The random number that is generated at this point is recorded in a certain location (for example inside the AP1 working area). At external device 200, a process of encrypting this returned random number in accordance with a predetermined algorithm and providing a verification command (5), which contains the obtained encrypted data, "AuthData," to IC card 100 is performed. The "AuthData" in verification code (5) shown in FIG. 2 is thus encrypted data prepared based on the random number that was obtained as a response to verification command (4). Upon receiving verification command (5), process executing part 120 encrypts the priorly generated random number by an algorithm (contained in application program AP1) equivalent to the encryption carried out at external device 200, and verifies whether or not the result matches the encrypted data, "AuthData," contained in verification command (5). Obviously, this verification result is also written into the AP1 working area.

Thus by the execution of verification commands (3) to (5), the verification process concerning application AP1 is carried out and the verification result is stored in the AP1 working area inside working data storage part 134. Verification commands (6) to (8) are the same types of verification commands concerning application AP2, and the result of the verification process based on these verification commands is stored inside the AP2 working area inside working data storage part 134. Though in the example shown in FIG. 2, after preparation commands (1) and (2) concerning the two applications are executed, verification commands (3) to (5) concerning application AP1 are executed and then verification commands (6) to (8) concerning application AP2 are executed, as long as the condition of "executing the preparation command and thereafter executing the verification command" is satisfied for each specific application, the order of the respective commands can be changed freely. For example, verification command (6) may be executed immediately after verification command (3) or verification commands (3) to (5) may be executed immediately after preparation command (1). Since each command contains an identifier, which application a command is for can be identified for each command by means of this identifier.

When preparation commands (1) and (2) and verification commands (3) to (8) of FIG. 2 are thus completed, the preparation process and verification process for the two applications AP1 and AP2 are completed, and the environment for using both applications is fully prepared. In this state, process executing commands for these two applications can be provided from external device 200 and executed. However, since a plurality of applications are made useable simultaneously, each process executing command is made to contain an identifier for specifying the application that is to execute the command. When a process executing command for executing a specific process is provided to an application program thus designated by an identifier, process executing part 120 references the verification result stored in the application working area that is secured for the corresponding application, judges whether or not the execution of the provided process executing command is enabled, and if it is judged that execution is enabled, uses the corresponding application to execute the specific process.

For example, since process executing command (9) of FIG. 2 contains the identifier, "Ch1," process executing part 120 executes this command based on application AP1. In this process, first the verification result stored in the AP1 working area (the verification result obtained by the execution of verification commands (3) to (5)) is referenced and whether or not the execution of this command is enabled is judged. For example, in a case where the information indicating either success or failure of verification is stored as the verification result (specifically, in a case where information indicating the matching or mismatching of a password, etc., is recorded), the judgment that the execution of the command is enabled is made only if information indicating success of verification is stored. If a positive judgment is made, the corresponding command is executed and a response is returned accordingly, while if a negative judgment is made, a response indicating error is returned. Specifically, process executing command (9) is a command for reading the data of a record, "Record 2," inside a file, "File 3," and with this command, the corresponding data among user data UD1 inside user data storage part 133 are read and returned as a response to external device 200.

Meanwhile, since process executing command (10) of FIG. 2 contains the identifier, "Ch2," process executing part 120 executes this command based on application AP2. In this process, first the verification result stored in the AP2 working area (the verification result obtained by the execution of verification commands (6) to (8)) is referenced and whether or not the execution of this command is enabled is judged. The command is executed only if a positive judgment is made. Specifically, process executing command (10) is a command for renewing a record, "Record 1," inside a file, "File 2," by data read immediately priorly, and the contents of the corresponding record among user data UD2 inside user data storage part 133 are rewritten with data read by process executing command (9) and a response indicating success of rewriting is returned to external device 200.

Thus if the IC card of the present invention is used in a manner such as described above, in a case where a diagnosis and treatment record is to be written into the IC card as a hospital registration card and a diagnosis and treatment fee is to be paid using the IC card as a financial account card, by putting both diagnosis card application AP1 and financial account application AP2 in use-enabled states and verification-completed states and then providing process executing commands that designate either application by means of identifiers, a desired application can be made to execute a desired process. Though an example where two process executing commands (9) and (10) are provided is illustrated with the example shown in FIG. 2, as long as the commands are process executing commands concerning application AP1 or AP2, a plurality of commands can be provided in continuation subsequently. Moreover, the application targeted by a command can be designated by an identifier and a verification process does not have to be performed anew in switching between applications. Thus by the IC card according to the present invention, a form of use, wherein a series of linked processes are executed using a plurality of applications in a single communication session, can be implemented smoothly.

<<<§ 3. Modification Examples of the Portable Information Recording Medium of the Invention >>>

A basic embodiment to which this invention is applied to an IC card was described above. Here, modification examples of this invention shall be described.

(1) As mentioned above, with this invention, when a verification command concerning a certain application program is provided from an external device, process executing part 120 executes a verification process based on this verification command, stores the verification result in an application working area concerning the corresponding application, and when a process executing command concerning the application is provided thereafter, the verification result is referenced to determine whether or not the execution of the command is enabled. Here, what should be noted is that the verification result that is stored in the application working area is not necessarily "a two-choice result of success of verification or failure of verification." That is, for practical use, a plurality of types of verification results may be stored in accordance with access rights held by external device 200. For example, a first password, which provides just the authority to read data, a second password, which provides the authority to read data and add data, and a third password, which provides full authority, including that to rewrite data, may be determined in advance and mutually different verification results may be stored in accordance with which password is used in the verification command. In this case, if verification by the first password is carried out, a verification result indicating that only the reading of data is enabled is written, if verification by the second password is carried out, a verification result indicating that the reading of data and the adding of data are enabled is written, and if verification by the third password is carried out, a verification result indicating that all processes are enabled is written.

With the example shown in FIG. 4, information, which indicates lists of commands enabled for execution by individual application programs subject to verification, is stored as verification results in application working areas. With this example, information indicating the three commands of "READ RECORD (command for reading the data of a single record)," "UPDATE RECORD (command for updating the data of a single record)," and "WRITE RECORD (command for adding data to a single record)" is stored as the verification result in the application AP1 working area, and information indicating the two commands of "READ RECORD" and "UPDATE RECORD" is stored as the verification result in the application AP2 working area. By storing such a list of executable commands as the verification result, when an arbitrary command is provided, whether or not the execution of this command is enabled can be judged immediately.

(2) With this invention, when a preparation command concerning a specific application program is provided, an application working area for this application is secured inside working data storage part 134 by process executing part 120. However, the size of the working area that should be secured normally differs with each individual application, and there are applications that require a working area of large size as well as applications that suffice with a working area of small size. Thus for practical purposes, it is preferable to make process executing part 120 examine the contents of the application programs stored in application storage part 132 and secure application working areas of sizes that are in accordance with the examination results. For example, when preparation command (1), shown in FIG. 2, is provided, process executing part 120 examines the contents of application program AP1 stored in application storage part 132 and secures an AP1 working area of a size that is in accordance with this program. Specifically, variable definition statements, array declaration statements, etc., inside the programs are recognized and the necessary sizes are determined by a predetermined algorithm in accordance with the variables and arrays used.

(3) Though with the above-described embodiment, an example using character strings, such as "Ch1," "Ch2," etc., as identifiers was described, any form of data may be used for the identifiers as long as they are defined uniquely according to the respective applications. Since in putting this invention to practice, a verification command or a process executing command for each application must contain an identifier for specifying the application, an identifier made up of short a data as possible is preferable for practical use. For example, in a case of an IC card designed to enable use of a maximum of four applications simultaneously, the identifiers, "00," "01," "10," and "11," which are made up of two bits, will suffice.

Also in putting this invention into practice, mutually different and unique identifiers must be attached to a plurality of applications that are simultaneously put in a use-enabled state. Thus in order to prevent a preparation command, which would attach the same identifier to a plurality of different applications, from being issued erroneously from external device 200, it is preferable to enable inquiry using an inquiry command to be performed prior to the issuing of the preparation command. That is, external device 200 is enabled to provide an inquiry command (OS command) that makes an inquiry concerning a newly useable identifier, and process executing part 120 is enabled, upon receiving such an inquiry command, to perform a process of examining the OS working area and thereby recognizing defined and undefined identifiers and returning the recognized identifiers as a response to external device 200.

FIG. 5 is a diagram showing specific examples of such an inquiry command and corresponding responses. With this example, the inquiry command is an OS command made up of the character string, "MANAGE CHANNEL." By preparing a routine that processes such an inquiry command in apart of the OS program, process executing part 120 can be made to perform a process of performing the above-described examination in accordance with this routine and returning a response. FIG. 5 shows an example where defined identifiers (Ch1, Ch2) are returned as a response and an example where identifiers in the undefined state (Ch3 to Ch8; this example is premised on the eight identifiers of Ch1 to Ch8 being prepared in advance as identifiers) as a response. After receiving such a response, external device 200 can provide a correct preparation command, with which already-defined identifiers will not be defined redundantly, in consideration of the contents of the response.

(4) With the above-described embodiment, after providing a preparation command for a specific application to prepare for use of the application, a verification command concerning the application is provided to execute a verification process and whether or not the executing of a process executing command for the application is enabled is judged based on this verification process result. However, in a form of use with which verification is not necessary for the execution of a process, the provision of a verification command is not necessary, and for an application for which preparation by the preparation command has been completed, a process executing command may be provided and the process may be executed immediately.

(5) Process executing part 120 in the above-described embodiment executes various processes based on the OS program stored in OS storage part 131 or any of the application programs stored in application storage part 132. Here, since a preparation command for putting a certain application program in a use-enabled state cannot be executed by the application program itself that is the subject of the preparation command, a preparation command is normally executed by an OS program (depending on the case, a preparation command may be executed by another application program). On the other hand, a verification command or other process executing command may be executed by an OS program or by an application program. However, in the case of a general IC card, a form of use, wherein an OS program is already installed at the time of issue of the card and the respective application programs are added as suited after issue, is adopted in many cases, and application programs are thus higher in the degree of freedom than the OS program. Thus for practical use, it is preferable to design so that the actual processing parts of verification commands and other processing execution commands are executed by the respective application programs while the OS program serves the role of handing over these command to the respective application programs.

INDUSTRIAL APPLICABILITY

As described above, the portable information recording medium according to the present invention enables adequate security to be ensured for each individual application and yet enable a series of linked processes to be performed smoothly while switching among a plurality of application programs in the same communication session. The portable information recording medium of the invention is thus optimal for uses, in which a plurality of different application programs are made to operate on the same, single IC card for financial service processing, credit service processing, medical service processing, etc., and can be used in various industrial fields.

What is claimed is:

1. Portable information recording medium (100) having a function of being connected as necessary to an external device (200) and performing command-and-response interactions with the external device to record user data (UD1 to UD3) to be recorded inside the medium and perform various processes, the portable information recording medium comprising:

an I/O part (110), communicating with the external device (200);

an OS storage part (131), storing an OS program;

an application storage part (132), storing a plurality of application programs (AP1 to AP3);

a user data storage part (133), storing user data (UD1 to UD3);

a process executing part (120), executing a command provided from the external device (200) and returning an execution result as a response to the external device based on said OS program or said application programs (AP1 to AP3); and a working data storage part (134), used as a working area for said process executing part (120) and securing at least an OS working area for storing working data for said OS program;

wherein said OS storage part (131), said application storage part (132), and said user data storage part (133) are arranged from non-volatile memories and said working data storage part (134) is arranged from a volatile memory;

wherein when a preparation command including information designating an application program (AP1 to AP3) and a unique identifier (Ch1, Ch2) to be attached to the designated application program is provided from the external device (200), the process executing part (120) executes a process of securing an application working area for storing working data for the designated application program in said working data storage part (134), and a process of storing information defining a correspondence between the designated application program and the identifier to be attached thereto and information specifying the secured application working area in said OS working area, thereby setting up a state in which use of the designated application program is enabled; and wherein when a process executing command for making a specific application program (AP1 to AP3) designated by an identifier (Ch1, Ch2) execute a specific process is provided from the external device (200), the process executing part (120) executes said specific process in accordance with said specific application program and using an application working area secured for said specific application program, wherein when a verification command for performing verification concerning an application program (AP1 to AP3) designated by an identifier (Ch1, Ch2) is provided from the external device (200), the process executing part (120) executes a verification process in accordance with said verification command and a process of storing a verification result in an application working area secured for said application program; and wherein when a process executing command for making said application program (AP1 to AP3) designated by said identifier (Ch1, Ch2) execute a specific process is provided from the external device (200), the process executing part (120) executes a process of referencing said verification result stored in the application working area secured for said application program, judging whether or not an execution of said process executing command is enabled, and if a judgment that the execution is enabled is made, executing said specific process in accordance with said application program and if a judgment that the execution is not enabled is made, returning a response indicating error to the external device (200).

2. The portable information recording medium (100) as set forth in claim 1:

wherein when a verification command concerning a specific application program (AP1 to AP3) is provided from the external device (200), the process executing part (120) stores information as a verification result in the application working area, said information indicating a list of commands enabled for execution by said specific application program.

3. The portable information recording medium (100) as set forth in claim 1:

wherein, as information which specifies an application working area secured in the working data storage part (134), a head address (Add12, Add22) of said area and a size of said area are stored in the OS working area.

4. The portable information recording medium (100) as set forth in claim 1:

wherein when a preparation command is provided from the external device (200), the process executing part (120) examines contents of an application program (AP1 to AP3) stored in the application storage part (132) and secures an application working area of a size that is in accordance with an examination result.

5. The portable information recording medium (100) as set forth in claim 4:

wherein a size of an application working area for an application program (AP1 to AP3) is determined based on information concerning variables and arrays used in the application program.

6. The portable information recording medium (100) as set forth in claim 1:

wherein when an inquiry command, which makes an inquiry concerning a newly useable identifier (Ch3 to Ch8), is provided from the external device (200), the process executing part (120) performs a process of examining the OS working area to recognize identifiers in defined and undefined states and returns recognized identifiers as a response to the external device.

7. The portable information recording medium (100) as set forth in claim 1:

wherein, as information which specifies an application working area secured in the working data storage part (134), a head address (Add12, Add22) of said area and a size of said area are stored in the OS working area.

8. The portable information recording medium (100) as set forth in claim 2:

wherein, as information which specifies an application working area secured in the working data storage part (134), a head address (Add12, Add22) of said area and a size of said area are stored in the OS working area.

9. The portable information recording medium (100) as set forth in claim 1:

wherein when a preparation command is provided from the external device (200), the process executing part (120) examines contents of an application program (AP1 to AP3) stored in the application storage part (132) and secures an application working area of a size that is in accordance with an examination result.

10. The portable information recording medium (100) as set forth in claim 2:

wherein when a preparation command is provided from the external device (200), the process executing part (120) examines contents of an application program (AP1 to AP3) stored in the application storage part (132) and secures an application working area of a size that is in accordance with an examination result.

11. The portable information recording medium (100) as set forth in claim 3:

wherein when a preparation command is provided from the external device (200), the process executing part (120) examines contents of an application program (AP1 to AP3) stored in the application storage part (132) and secures an application working area of a size that is in accordance with an examination result.

12. The portable information recording medium (100) as set forth claim 1:

wherein when an inquiry command, which makes an inquiry concerning a newly useable identifier (Ch3 to Ch8), is provided from the external device (200), the process executing part (120) performs a process of examining the OS working area to recognize identifiers in defined and undefined states and returns recognized identifiers as a response to the external device.

13. The portable information recording medium (100) as set forth claim 2:

wherein when an inquiry command, which makes an inquiry concerning a newly useable identifier (Ch3 to Ch8), is provided from the external device (200), the process executing part (120) performs a process of examining the OS working area to recognize identifiers in defined and undefined states and returns recognized identifiers as a response to the external device.

14. The portable information recording medium (100) as set forth claim 3:

wherein when an inquiry command, which makes an inquiry concerning a newly useable identifier (Ch3 to Ch8), is provided from the external device (200), the process executing part (120) performs a process of examining the OS working area to recognize identifiers in defined and undefined states and returns recognized identifiers as a response to the external device.

15. The portable information recording medium (100) as set forth claim 4:

wherein when an inquiry command, which makes an inquiry concerning a newly useable identifier (Ch3 to Ch8), is provided from the external device (200), the process executing part (120) performs a process of examining the OS working area to recognize identifiers in defined and undefined states and returns recognized identifiers as a response to the external device.

16. The portable information recording medium (100) as set forth claim 5:

wherein when an inquiry command, which makes an inquiry concerning a newly useable identifier (Ch3 to Ch8), is provided from the external device (200), the process executing part (120) performs a process of examining the OS working area to recognize identifiers in defined and undefined states and returns recognized identifiers as a response to the external device.

* * * * *